July 19, 1960     T. MAINARDI     2,945,266

PROCEDURE FOR THE MANUFACTURE OF TUBULAR CONTAINERS

Filed June 6, 1957

INVENTOR.

United States Patent Office 2,945,266
Patented July 19, 1960

2,945,266

PROCEDURE FOR THE MANUFACTURE OF TUBULAR CONTAINERS

Teresa Mainardi, % Ing. Armando Giambrocono, Via Durini 4, Milan, Italy

Filed June 6, 1957, Ser. No. 664,124

Claims priority, application Italy June 12, 1956

1 Claim. (Cl. 18—59)

This invention refers to an improved process for the manufacture of plastic tubular containers.

The object of this invention is to provide a cheap and speedy process for the production of plastic containers in that the tubular portion of each container is constituted by a section cut directly from a length of drawn or extruded plastic tubing and the container head is molded on to said tube section utilizing the container cap as a mold.

The following advantages are thus obtained:

(a) A considerable saving in the mold construction, as the most delicate part of such a construction is in forming the container cap receiving portion of the head.

(b) The cap is already fitted to the container head, thus saving the operation of fitting the cap to the container head.

(c) The container is provided with a sealed film made of plastic material and covering the cap.

According to the present invention a process for the manufacture of plastic tubular containers comprises in combination the steps of inserting a cap into a mold cavity presenting an opening formed in its bottom for the passage of plastic material and a shoulder portion, said mould cavity fitting said cap loosely and presenting said bottom provided with projections so as to space the cap from the bottom, inserting a mandrel, presenting a shoulder portion and having the plastic tube mounted thereon, into said mold cavity until the head portion of said mandrel engages said cap and a leading edge of said plastic tube is supported by said shoulder portion of said mold cavity, forming the container head on the said leading edge and a thin film covering said cap by injecting a plastic material through said opening into the room confined by the cap, the mould cavity, said leading edge and said head portion of the mandrel.

The invention will be described further in connection with the accompanying drawings and the following detailed description, which form a part of this specification with the understanding however, that the invention is not confined to any strict conformity with the illustrated figures, but may be changed or modified, so long as such changes or modifications do not include a material departure from the salient feature of the invention as expressed in the appended claim.

Figure 1:
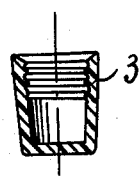
Fig. 1 shows a center line section of a container cap.
Figure 2:
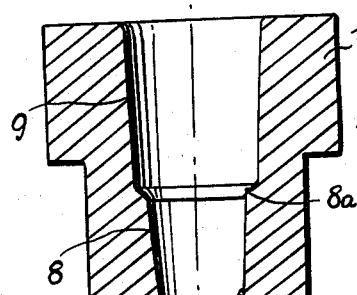
Fig. 2 shows diagrammatically an axial section of a mold.
Figure 3:
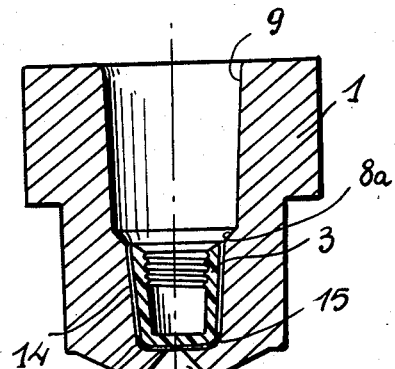
Fig. 3 is an axial section of the mold with a container cap inserted.

Referring now particularly to Figure 2, the mold 1 presents a lower cavity 8 provided in its bottom portion with a hole 7, through which the plastic material is injected during the moulding operation.

The cavity 8 is extended by way of a conical shoulder 8a into a larger cavity 9 which presents a tapered wall to allow easy removal of the completed molded container.

Figure 4:
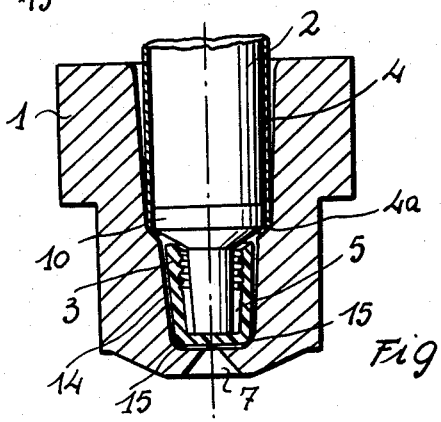
Fig. 4 is an axial section of a molding assembly prior to the injection of plastic material.

A tubular section (Figure 4) generally indicated by reference numeral 4, and constituting according to a feature of this invention the tubular body of a container is mounted on to the mandrel 2 by causing it to slip along the latter until an end portion 4a thereof projects slightly relative to a collar shaped portion 10 formed on the mandrel 2. As may be seen from Figure 4 the end portion 4a is pressed against the shoulder portion 8a of the mold 1 whilst the head portion 6 of the mandrel engages the cap 3 thus preventing the latter from displacement during the moulding operation.

The cap 3 presents a flat bottom and a set of projecting portions 15 are formed from bottom of cavity 8 to allow a spacing of cap 3 from the bottom of said cavity, whilst the head 6 of mandrel 2 provides a blocking and centering effect for the cap which in the example is a loose fit in the cavity.

During the moulding operation, plastic material will enter opening 7, pass around the crown of the cap 3 to gap 14 between cap 3 and cavity 8 and into the gap 5 between cap 3 and head 6 of the mandrel 2.

At the same time, plastic material reaches end portion 4a thus causing the container head to be welded to the tubular portion 4.

At the end of the molding operation a very thin film will cover the external surface of cap 3, which film would be removed before using the container for example by cutting it at its base, said film of course constitutes a seal for the manufacture and a guarantee for the consumer.

The cap 3 may be made of metal or of a plastic material preferably a thermosetting resin, and, in any case the melting temperature of said resin must be higher than the melting temperature of the plastic material constituting the body of the container.

By example the latter can be of a polyethylene or polyvinyl resin, and in any case it will be weldable to the material constituting said tubular body section of the container, whilst the substance of the cap can be by example ureaformaldehyde, phenolformaldehyde or the like.

Preferably, although not necessary, the substance of the tubular sections will be the same as the plastic molding material.

I claim:

A process for the manufacture of plastic containers from a plastic tube comprising the steps of inserting a cap into a mold having an opening formed in its bottom for the passage of plastic material and a shoulder portion, said mould fitting loosely said cap and having said bottom provided with projections so as to space the cap from the bottom, inserting a mandrel having a shoulder portion and having the plastic tube mounted thereon into said mold until the head portion of said mandrel engages said cap and a leading edge of said plastic tube is supported by said shoulder portion of said mold, forming the container head on the said leading edge and a thin film covering said cap by injecting a plastic material through said opening into the space defined by said cap, the mould wall, said leading edge and said head portion of the mandrel.

References Cited in the file of this patent

UNITED STATES PATENTS

| | | |
|---|---|---|
| 1,589,913 | Wells | June 22, 1926 |
| 1,754,496 | Barker | Apr. 15, 1930 |
| 1,935,942 | Conner | Nov. 21, 1933 |
| 2,158,044 | Haller | May 9, 1939 |
| 2,297,994 | Vellinga | Oct. 6, 1942 |
| 2,347,737 | Fuller | May 2, 1944 |
| 2,777,164 | Strahm | Jan. 15, 1957 |
| 2,786,238 | Shapero | Mar. 26, 1957 |